(12) United States Patent
Nelson et al.

(10) Patent No.: US 7,963,089 B2
(45) Date of Patent: Jun. 21, 2011

(54) DEEP DRAW CONTAINER FORMING METHOD

(75) Inventors: Jeffrey Nelson, Round Rock, TX (US); Jon Olson, Austin, TX (US)

(73) Assignee: Mystic Pharmaceuticals, Inc., Austin, TX (US)

( * ) Notice: Subject to any disclaimer, the term of this patent is extended or adjusted under 35 U.S.C. 154(b) by 64 days.

(21) Appl. No.: 12/210,862

(22) Filed: Sep. 15, 2008

(65) Prior Publication Data

US 2009/0071108 A1    Mar. 19, 2009

Related U.S. Application Data

(60) Provisional application No. 60/972,634, filed on Sep. 14, 2007.

(51) Int. Cl.
*B65B 47/00* (2006.01)
(52) U.S. Cl. ............................................. 53/453; 53/454
(58) Field of Classification Search .................. 53/453, 53/454, 457, 560; 72/347, 350, 379.4; 264/292, 264/294, 296, 297.5, 320, 323, 322
See application file for complete search history.

(56) References Cited

U.S. PATENT DOCUMENTS

| | | | |
|---|---|---|---|
| 1,870,558 A | 8/1932 | Darby | |
| 2,105,946 A | 1/1938 | Lewis | |
| 2,307,980 A | 2/1943 | Avrett | |
| 2,332,799 A | 10/1943 | Hunn | |
| 2,442,004 A | 5/1948 | Hayward-Butt | |
| 2,706,984 A | 4/1955 | Lipari | |
| 2,885,931 A | 4/1955 | McDonald | |
| 3,507,277 A | 4/1970 | Altounyan et al. | |
| 3,512,524 A | 5/1970 | Drewe | |
| 3,888,253 A | 6/1975 | Watt et al. | |
| 3,906,950 A | 9/1975 | Cocozza | |
| 3,948,264 A | 4/1976 | Wilke et al. | |
| 3,949,751 A | 4/1976 | Birch et al. | |
| 3,971,377 A | 7/1976 | Damani | |
| 4,013,075 A | 3/1977 | Cocozza | |
| 4,017,007 A | 4/1977 | Riccio | |

(Continued)

FOREIGN PATENT DOCUMENTS

GB    9125699    12/1991

(Continued)

OTHER PUBLICATIONS

PCT/US05/13962, International Search Report, Jan. 31, 2006.

(Continued)

*Primary Examiner* — Sameh H. Tawfik
(74) *Attorney, Agent, or Firm* — Vinson & Elkins LLP

(57) ABSTRACT

The present disclosure is directed to processes for manufacturing shaped articles for unit-dose packaging with at least one formed recess (e.g., a blister), in particular for unit-dose packaging of pharmaceutical dosage forms. In certain embodiments, the first step of the process is directed to drawing the film material (e.g., metal-plastic foil) with one or more plungers to form a primary contour, the contour having a depth of at least 100% and up to 150% of the depth of the formed recess. The second stage involves shaping the primary contour with one or more plunger(s) to the desired formed recess, with a depth that is less than the depth of the primary contour, while substantially maintaining the surface area of the primary contour formed in the first stage. The formed recess may be formed using warm-forming or cold-forming techniques.

31 Claims, 7 Drawing Sheets

U.S. PATENT DOCUMENTS

| | | |
|---|---|---|
| 4,090,642 A | 5/1978 | Baker |
| 4,095,596 A | 6/1978 | Grayson |
| 4,105,027 A | 8/1978 | Lundquist |
| 4,116,195 A | 9/1978 | James |
| 4,206,758 A | 6/1980 | Hallworth et al. |
| 4,423,724 A | 1/1984 | Young |
| 4,623,337 A | 11/1986 | Maurice |
| 4,896,832 A | 1/1990 | Howlett |
| 4,952,212 A | 8/1990 | Booth et al. |
| 4,966,581 A | 10/1990 | Landau |
| 4,995,385 A | 2/1991 | Valentini et al. |
| 5,048,727 A | 9/1991 | Vlasich |
| 5,152,284 A | 10/1992 | Valentini et al. |
| 5,207,217 A | 5/1993 | Cocozza et al. |
| 5,219,101 A | 6/1993 | Matkovich et al. |
| 5,273,190 A | 12/1993 | Lund |
| 5,287,850 A | 2/1994 | Haber et al. |
| 5,307,953 A | 5/1994 | Regan |
| 5,327,883 A | 7/1994 | Williams et al. |
| 5,337,740 A | 8/1994 | Armstrong et al. |
| 5,379,763 A | 1/1995 | Martin |
| 5,411,175 A | 5/1995 | Armstrong et al. |
| 5,425,480 A | 6/1995 | Rabenau et al. |
| 5,431,155 A | 7/1995 | Marelli |
| 5,433,343 A | 7/1995 | Meshberg |
| 5,469,989 A | 11/1995 | Graf et al. |
| 5,492,112 A | 2/1996 | Mecikalski et al. |
| 5,497,763 A | 3/1996 | Lloyd et al. |
| 5,524,419 A * | 6/1996 | Shannon ............... 53/431 |
| 5,529,059 A | 6/1996 | Armstrong et al. |
| 5,547,131 A | 8/1996 | Brace |
| 5,589,275 A | 12/1996 | Breitler et al. |
| 5,643,211 A | 7/1997 | Sadowski et al. |
| 5,683,361 A | 11/1997 | Elk et al. |
| 5,715,810 A | 2/1998 | Armstrong et al. |
| 5,715,811 A | 2/1998 | Ohki et al. |
| 5,769,278 A | 6/1998 | Kummer et al. |
| 5,810,004 A | 9/1998 | Ohki et al. |
| 5,813,570 A | 9/1998 | Fuchs et al. |
| 5,881,721 A | 3/1999 | Bunce et al. |
| 5,896,855 A | 4/1999 | Hobbs et al. |
| 5,901,703 A | 5/1999 | Ohki et al. |
| 5,911,325 A | 6/1999 | Breitler |
| 5,921,236 A | 7/1999 | Ohki et al. |
| 5,924,417 A | 7/1999 | Braithwaite |
| 5,944,222 A | 8/1999 | Fuchs et al. |
| 5,950,619 A | 9/1999 | Van der Linden et al. |
| 5,964,417 A | 10/1999 | Amann et al. |
| 5,970,974 A | 10/1999 | Van Der Linden et al. |
| 6,101,790 A * | 8/2000 | Mori et al. .............. 53/453 |
| 6,109,479 A | 8/2000 | Ruckdeschel |
| 6,123,068 A | 9/2000 | Lloyd et al. |
| 6,135,755 A * | 10/2000 | Zeiter et al. .............. 425/394 |
| 6,138,439 A * | 10/2000 | McMahon et al. ......... 53/412 |
| RE37,047 E | 2/2001 | Py |
| 6,186,141 B1 | 2/2001 | Pike et al. |
| 6,269,671 B1 | 8/2001 | Zeiter et al. |
| 6,321,942 B1 | 11/2001 | Krampen et al. |
| 6,367,473 B1 | 4/2002 | Kafer |
| 6,382,465 B1 | 5/2002 | Greiner-Perth |
| 6,425,888 B1 | 7/2002 | Embleton et al. |
| 6,443,152 B1 | 9/2002 | Lockhart et al. |
| 6,446,839 B1 | 9/2002 | Ritsche |
| 6,461,322 B1 | 10/2002 | Ritsche |
| 6,470,650 B1 * | 10/2002 | Lohwasser ............... 53/453 |
| 6,484,715 B1 | 11/2002 | Ritsche et al. |
| 6,530,371 B2 | 3/2003 | Jansen et al. |
| 6,543,448 B1 | 4/2003 | Smith et al. |
| 6,626,379 B1 | 9/2003 | Ritsche et al. |
| 6,644,309 B2 | 11/2003 | Casper et al. |
| 6,679,248 B2 | 1/2004 | Stadelhofer |
| 6,699,566 B2 | 3/2004 | Zeiter et al. |
| 6,705,313 B2 | 3/2004 | Niccolai |
| 6,708,846 B1 | 3/2004 | Fuchs et al. |
| 6,725,857 B2 | 4/2004 | Ritsche |
| 6,726,665 B1 | 4/2004 | Embleton et al. |
| 6,703,066 B1 | 5/2004 | Bennwik et al. |
| 6,732,732 B2 | 5/2004 | Edwards et al. |
| 6,758,837 B2 | 7/2004 | Peclat et al. |
| 6,772,915 B2 | 8/2004 | Helmlinger |
| 6,782,887 B2 | 8/2004 | Sullivan |
| 6,877,672 B2 | 4/2005 | Stihl |
| 6,889,690 B2 | 5/2005 | Crowder et al. |
| 6,929,005 B2 | 8/2005 | Ritsche et al. |
| 6,957,909 B1 | 10/2005 | Dingeldein et al. |
| 7,235,063 B2 | 6/2007 | D'Antonio et al. |
| 7,270,127 B2 | 9/2007 | Lockhart et al. |
| 2001/0007327 A1 | 7/2001 | Ritsche et al. |
| 2003/0105430 A1 | 6/2003 | Lavi et al. |
| 2003/0199832 A1 | 10/2003 | Greiner-Perth et al. |
| 2005/0000518 A1 | 1/2005 | Dunkley et al. |
| 2005/0016533 A1 | 1/2005 | Schuler et al. |
| 2005/0022813 A1 | 2/2005 | Alston |
| 2005/0048003 A1 | 3/2005 | Ohki et al. |
| 2005/0051166 A1 | 3/2005 | Glusker et al. |
| 2005/0056280 A1 | 3/2005 | Alston et al. |
| 2005/0081852 A1 | 4/2005 | Rangachari |
| 2005/0150492 A1 | 7/2005 | Dunkley et al. |
| 2006/0237009 A1 | 10/2006 | Jones |
| 2007/0051362 A1 | 3/2007 | Sullivan et al. |
| 2008/0177246 A1 | 7/2008 | Sullivan et al. |
| 2008/0283439 A1 | 11/2008 | Sullivan et al. |

FOREIGN PATENT DOCUMENTS

| | | |
|---|---|---|
| WO | 94/19184 | 9/1994 |
| WO | 9600050 | 1/1996 |
| WO | 9723177 | 7/1997 |
| WO | 2005102058 A2 | 11/2005 |

OTHER PUBLICATIONS

Abelson, M.B. and Rosner, Sarah A., "Prevent Drugs From Going Missing in Action," Review of Opthalmology, Jun. 15, 2003, 10:6, pp. 96-98.

Abelson, M.B. and Shapiro, A., "Hitting the Bull's-eye With Drug Delivery," Review of Opthalmology, Jul. 15, 2003, 10:7, pp. 82-84.

Aurora, Jack, "Nasal Delivery, Articles: Development of Nasal Delivery System: A review," Drug Delivery Technology, 2002, 2(7); pp. 70-73.

Chiarello, Kaylynn, "Bi-directional Nasal Device Delivers Drug on Exhalation," In the Field Pharmaceutical Science & Technology News, Sep. 2004, pp. 15-18.

Ingelheim, Bochringer, "Aseptic Production of Pharmaceuticals in Boehringer Ingelheim Using Blow-Fill-Seal Technology," Technology & Services, Business Briefing: Pharmatech, 2003, pp. 1-3.

Lofgren, Anders et al., "Blow-Fill-Seal Pharmaceutical Packaging—Towards Safe and Convenient Medical Containers," Business Briefing: Pharma Outsourcing, Jan. 2004, pp. 78-81.

Jenevieve B. Polin, "Blow-Fill-Seal Technology for Unit Dosing," Pharmaceutical & Medical Packaging News, Sep. 2003.

O'Riordan, Thomas G., "Inhaled Antimicrobial Therapy: From Cystic Fibrosis to the Flu," Respiratory Care, Jul. 2000, vol. 45, No. 7, pp. 836-845.

Saettone, Marco F., "Progress and Problems in Opthalmic Drug Delivery," Business Briefing: Pharmatech, May 2003, pp. 167-171.

Salt, Alec N., "Simulation of Methods for Drug Delivery to the Cochlear Fluids," Felix D. Oestreicher, e. (eds.): Rational Pharmacotherapy of the Inner Ear. Adv. Otorhinolaryngol. Basel, Karger, 2002, vol. 59, p. 140.

Guidance for Industry, "Container Closure Systems for Packaging Human Drugs and Biologies," U.S. Dept. of Health and Human Services, FDA, CDER, CBER, May 1999.

Guidance for Industry, "Sterile Drug Products Produced by Aseptic Processing—Current Good Manufacturing Practice," U.S. Dept. of Health and Human Services, FDA, CDER, CBER, ORA, Sep. 2004.

* cited by examiner

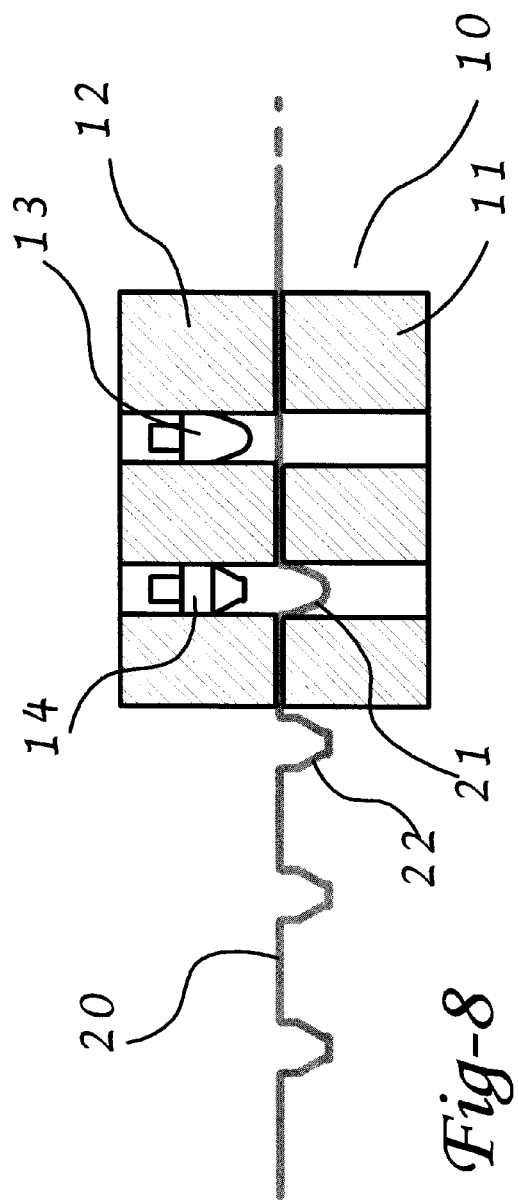
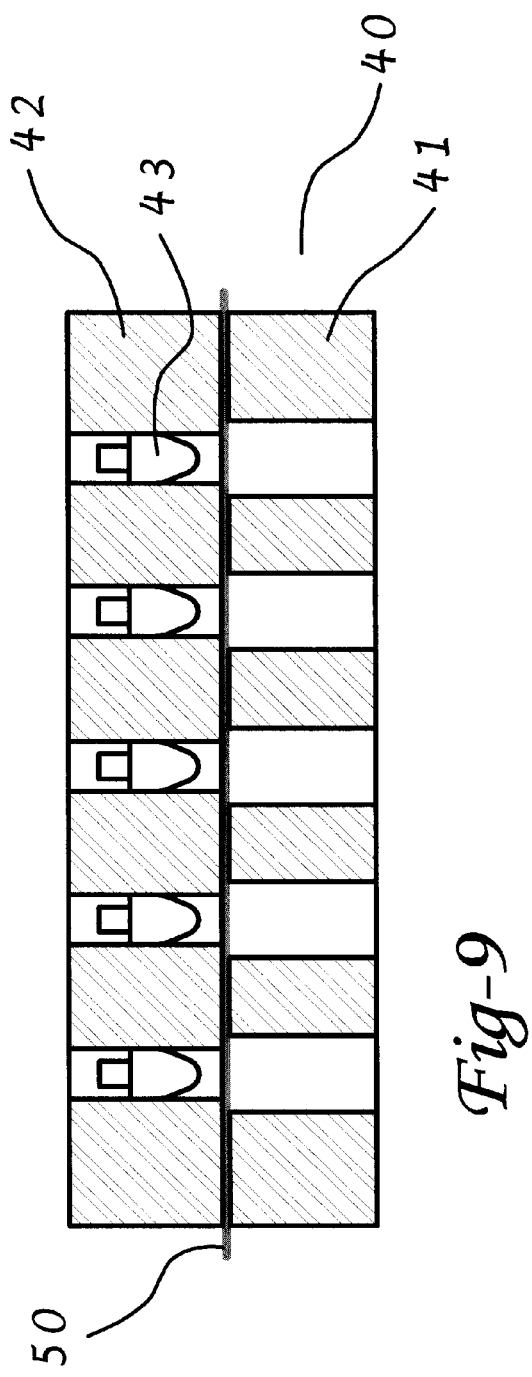

DEEP DRAW CONTAINER FORMING METHOD

CROSS-REFERENCES TO RELATED APPLICATIONS

This application claims priority to U.S. Provisional Application Ser. No. 60/972,634, filed Sep. 14, 2007, and International Patent Application PCT/US08/76399, entitled "Deep Draw Container Forming Method," filed on Sep. 15, 2008, the entire contents of each of which are incorporated herein by reference.

STATEMENT REGARDING FEDERALLY SPONSORED RESEARCH OR DEVELOPMENT

None.

BACKGROUND OF THE INVENTION

1. Field of the Invention

This disclosure relates to shaped structures or containers and methods of manufacturing shaped structures suitable for use in packaging articles, for example pharmaceutical products. In particular, this disclosure relates generally to blister packages and methods of manufacturing blister packages.

2. Description of Related Art

Shaped articles, such as a shaped structure, shaped packaging, or shaped blister (e.g., blister packs), have been commonly used to package a variety of products, including pharmaceutical dosage forms, where each individual unit-dose of the product may be contained or housed separately from each other and protected from the environment. Pharmaceutical dosage forms (e.g., pharmaceutical compositions), especially those packaged as individual pre-measured doses, present significant packaging challenges, as many such products are susceptible to chemical or photo-degradation, chemical reaction and/or inactivation upon exposure to air, water, light or other environmental factors. Given the frequently considerable cost of such dosage forms, as well as the importance of delivering the intended dose of active ingredient(s) to a patient, losses or deterioration due to such environmental variables must be rigorously protected against.

Blister packs, also sometimes referred to as push through packs, have been used for many years to house individually separated products, including individual doses of pharmaceutical dosage forms. Typically, blister packs contain an array or series of blisters positioned in a square or rectangular-shaped film. Each blister contains the product therein and is covered with a cover layer such as a lidding secured to the film layer at least at the perimeter of the top of each blister. This lidding typically seals the blister and protects the contents therein by isolating the contents from the environment outside the blister. Any conventional lidding material and techniques well-known to those of skill in the art can be used to seal the formed recess. For example, polymeric sheet layers, metallic sheet layers such as foil, and bonding techniques associated therewith such as adhesives and the like can be used.

Blisters in blister packs may be manufactured by deforming a film layer, which may be accomplished by a number of different techniques known to those of skill in the art. Generally, shaped blisters are made by deep drawing, stretch-drawing or thermoforming of a film. Other blister-forming techniques include blow forming and vacuum forming softened films against a die. Blisters typically are produced in circular, square or rectangular overall cross-sections. Additionally, film layers may be in the form of a laminate including a metal foil coated with a plastic, for example to manufacture shaped articles where a section of the film is forced into a mold defining a recess having substantially similar dimensions to the desired shape of the blister to be created.

Blister packs can also have the additional function of acting as a mold during the manufacturing process of a product such as a pharmaceutical dosage form. In such an example, the blister pack acts as a mold for forming the product, as well as the containment and packaging for the in situ molded product. For example, in situ molded dosage forms can be prepared by depositing a liquid form of a composition directly in a blister and subsequently treating the blister and its contents such that the composition solidifies to form the final dosage form. This technique may be used to prepare freeze-dried or lyophilized dosage forms, for example. An example of such a technique is disclosed in Thompson et al., U.S. Pat. No. 5,457,895.

Processes for forming shaped packaging of laminates containing metal foils typically involve shaping tools including a stamp (i.e., a plunger), a die, and a retaining tool. As it is being deformed, the laminate is clamped securely between the die and the retaining tool, and the stamp is moved towards the laminate. As it is lowered, the stamp moves deeper into the openings in the die thereby deforming the laminate. In such a process, the flat laminate is converted into a shaped part exhibiting one or more recesses which are surrounded by an area corresponding to the original flat plane of the laminate. Only that part of the laminate in the region of the die opening can flow or be stretched to form a shaped part. The process methods known in the art are limited, however, because adequate lateral distance must be maintained between the stamp and the die opening in order that the laminate, especially laminates containing metal foil, can be deformed without cracks and pores forming, and the process should not generate folds in any layer of the laminate. In addition, heat treatments of such foils can generate irregularities in the formed film, and can make subsequent handling of the formed film difficult.

Two areas of concern with forming blister packs using methods known in the art are the uniformity of the material thickness after the draw is complete, and fracturing of the material. For example, current methods draw the film material in a manner that does not adequately distribute the stresses evenly in the blister, which results in uneven distribution of the material and leads to higher stresses and a greater likelihood of failures. In addition, the material is more likely to have thin spots that are prone to fractures. Thus, processes that can overcome these deficiencies are needed in the art.

BRIEF SUMMARY OF THE INVENTION

The present disclosure is directed to processes for manufacturing shaped articles for unit-dose packaging with at least one formed recess. One advantage of the processes disclosed herein is that as the film is drawn to form a recess, the resulting stresses on the film are more evenly distributed in the formed recess then in current methods, which reduces the likelihood of thin spots, fractures, and other failures of the formed recesses. Current limitations on processes for blister forming do not adequately address the difficulties with complicated blister shapes such as deep blisters or blisters with steep angled/vertical walls. The limitations are compounded when manufacturing deep drawn blisters with a small inner radius and vertical walls. In certain embodiments of the present disclosure, the film material is drawn with a plunger(s) that is designed to evenly distribute the stress and the material to a depth that is not based on the final depth of the formed recess, but rather to a depth associated with the first stage of drawing being formed to the final surface area of the formed recess. At this point a second stage plunger(s) with complicated features such as a small radius and vertical walls then reshapes the drawn film into the final formed recess while maintaining the surface area formed in the first stage. Current methods that form blisters from metal-plastic foils also have complications associated with delamination of the plastic layers from the foil, particularly when the blisters contain fluids. The problem results when the plastic materials retain residual stresses causes by the forming process that tend to cause the plastic to spring back at a different rate than the foil. As disclosed herein, warm-forming processes may overcome this problem by allowing such stresses to be relaxed in the plastic materials, thereby reducing delamination.

In certain embodiments, the processes disclosed herein comprise:
(a) holding a film between at least one retaining tool and at least one die, wherein the die has at least one die opening;
(b) driving a first plunger into the die opening, which causes the film to be formed into a primary contour, the contour having a depth of at least 100% and up to 150% of the depth of the formed recess, and an Area Ratio of about 1.0/1 to 3.0/1, and any ranges therein;
(c) driving a second plunger into the primary contour to a depth that is less than the depth of the primary contour, wherein the second plunger forms a different geometric shape for the formed recess with substantially the same Area Ratio as the primary contour.

The Area Ratio may be calculated as the Formed Surface Area/Beginning Surface Area Within Mold Clamp. The film may be selected from suitable materials well known to those of skill in the art, including, for example, a metal-plastic laminate, which may have a plastic layer on one or both sides of the metal foil layer. The steps (b) and (c) may both be performed using a warm-forming process, a cold forming process, or a combination of warm-forming and cold-forming steps. In some embodiments, the shaped article is a shaped blister. Certain embodiments of the present disclosure further comprise placing a unit dose of a pharmaceutical dosage form and/or piercers (e.g., internal piercers) in the packaging recess. In other embodiments, the shaped articles of the present disclosure maybe associated with an external piercer. The pharmaceutical dosage form may comprise one or more active ingredients, and may be in a solid form, an aqueous form, or a form that is subsequently solidified (e.g., formulations which are lyophilized, freeze-dried, or subjected to solid state dissolution). After the recess is formed, a lid stock such as a metal foil lidding may be sealed onto the shaped article.

After the primary contour is formed, the second plunger may be driven into the primary contour to a depth that is less than the depth of the primary contour (i.e., up to about 100% of the primary contour), and may redistribute, reshape, or stretch the film of the primary contour to a different geometric shape, thereby forming the formed recess. In certain embodiments, the retaining tool is an upper die plate and the die is a lower die plate. In other embodiments, the upper die plate comprises the first plunger and the second plunger, while the lower die plate comprises a primary forming chamber and a final forming chamber. The plunger may comprise a surface or a finish that influences the level of friction between the plunger and the film. For example, the first plunger may comprise a high friction forming surface, the second plunger may comprise a low friction forming surface, and/or the first (or previous) plunger may have a higher friction forming surface than the second (or subsequent) plunger. As used herein, a "high friction forming surface" is a surface that prevents or impedes the film from slipping or sliding over the surface of the plunger. As used herein, a "low friction forming surface" is a surface that assists or contributes to the film slipping or sliding over the surface of the plunger. When a series of plungers are used in forming the recess, the plungers may be sequenced such that there is a gradual reduction in the degree of friction between the plungers and the film. In addition, different topography, geometry, molding, configuration, materials, surface finishes, or combinations thereof may be utilized with the plungers, for example on the end of the plungers, to affect the friction between the plungers and the film.

In other embodiments, the die may have a plurality of spaced die openings, which may comprise sequential forming chambers, including a primary forming chamber and a final forming chamber. The die openings may be spaced in a single row, or in multiple rows. In certain embodiments, the forming chambers are aligned with a plurality of plungers, which are used sequentially to create the formed recess. The plungers may be lowered sequentially into the same die opening, or sequentially into a series of forming chambers, for example by pushing the film from die to die, e.g., from chamber to chamber, such that the film is advanced after being further formed by a plunger, until it comes to the final forming chamber and plunger and is given its final formed shape. The plurality of plungers include at least a first and a second plunger, and may include a third plunger, and additional sequential plungers for creating the formed recess. After the primary contour is formed in the film, a second or final plunger is used to redistribute, reshape or stretch the primary contour to add geometric features, thereby forming the formed recess. The final shape of the formed recess may be accomplished by one or more additional plungers, which add the desired geometric features to the contour and/or stretch it to the final desired area and shape. In certain embodiments, when the film comprises an aluminum foil, the plunger(s) may be shaped to take into account the grain of the aluminum and produce greater stretch area without rupture of the aluminum layer of the laminate.

Other embodiments of the present disclosure include devices for manufacturing a shaped article for unit-dose packaging with at least one formed recess as disclosed herein, which comprises:
(a) at least one retaining tool and at least one die having at least one die opening, wherein the retaining tool and die are adapted to hold a film therebetween; and
(b) a first plunger and a second plunger which may be driven into the die opening to cause the film to be formed into a formed recess in the film;
wherein the first plunger is operative to first draw the film into primary contour, the contour having a depth of at least 100% and up to 150% of the depth of the formed recess, and an Area Ratio calculated as the Formed Surface Area/Beginning Surface Area Within Mold Clamp of about 1.0/1 to about 3.0/1, and any ranges therein, and the second plunger is operative to form the primary contour into a different geometric shape for the formed recess with substantially the same Area Ratio as the primary contour, wherein the formed recess has a depth that is less than the depth of the primary contour.

Another embodiment of the present disclosure is directed to shaped packaging, for example warm-formed shaped packaging, which comprises a plurality of shaped articles comprising a formed recess in a film, for example a metal-plastic laminate, wherein the formed recess has a surface area wherein the ratio of the area of the formed recess to the area of the opening in the plane of the laminate is about 1.0/1 to about 3.0/1, for example, about 2.0/1. In some embodiments, a foil lidding is sealed onto the shaped packaging. In certain embodiments, the shaped article is a shaped blister.

In another embodiment of the present disclosure, shaped packaging, for example warm formed shaped packaging, is prepared by a process comprising:
(a) holding a film between at least one retaining tool and at least one die, wherein the die has at least one die opening;
(b) driving a first plunger into the die opening, which causes the film to be formed into a primary contour, the contour having a depth of at least about 100% and up to about 150% of the depth of the formed recess, and an Area Ratio of about 1.0 to about 3.0; and
(c) driving a second plunger into the primary contour to a depth that is less than the depth of the primary contour, wherein the second plunger forms a different geometric shape for the formed recess with substantially the same Area Ratio as the primary contour;
wherein the first and second plungers are warmed from between about 35° C. to about 95° C. The shaped packaging produced may have one or more shaped articles (e.g., shaped blisters) comprising a formed recess in a film (e.g., a metal-plastic laminate), wherein the formed recess has a surface area wherein the ratio of the area of the formed recess to the area of the opening in the plane of the laminate is about 1.0/1 to about 3.0/1, for example about 2.0/1. In certain embodiments, a foil lidding is sealed onto the shaped packaging.

It is contemplated that any embodiment discussed in this specification can be implemented with respect to any process, device, or composition of the invention, and vice versa. The term "about" as used herein is defined as being close to as understood by one of ordinary skill in the art, and in one non-limiting embodiment the terms are defined to be within 10%, within 5%, within 1%, or within 0.5%. The term "substantially" and its variations as used herein are defined as being largely but not necessarily wholly what is specified as understood by one of ordinary skill in the art, and in one non-limiting embodiment substantially refers to ranges within 10%, within 5%, within 1%, or within 0.5%. The use of the word "a" or "an" when used in conjunction with the term "comprising" in the claims and/or the specification may mean "one," but it is also consistent with the meaning of "one or more," "at least one," and "one or more than one."

It is to be understood that each of the variously stated ranges herein is intended to be continuous so as to include each numerical parameter between the stated minimum and maximum value of each range. It is to be further understood that, while not intending to limit the applicability of the doctrine of equivalents to the scope of the claims, each numerical parameter should at least be construed in a manner consistent with the reported number of significant digits for each numerical parameter and by applying ordinary rounding techniques. It is to be even further understood that, while not intending to limit the applicability of the doctrine of equivalents to the scope of the claims, even though a number may be contained within a numerical range wherein at least one of the minimum and maximum numbers of the range is preceded by the word "about," each numerical value contained within the range may or may not be preceded by the word "about." For Example, a range of about 1 to about 4 includes about 1, 1, about 2, 2, about 3, 3, about 4, and 4.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

BRIEF DESCRIPTION OF THE SEVERAL VIEWS OF THE DRAWINGS

The following drawings form part of the present specification and are included to further demonstrate certain aspects and embodiments of the present invention. The disclosure may be better understood by reference to one or more of these drawings in combination with the detailed description of specific embodiments presented herein.

FIG. 8 shows a section of single row of dies
FIG. 9 shows a section of multiple rows of dies

DETAILED DESCRIPTION OF THE INVENTION

Figure 1:
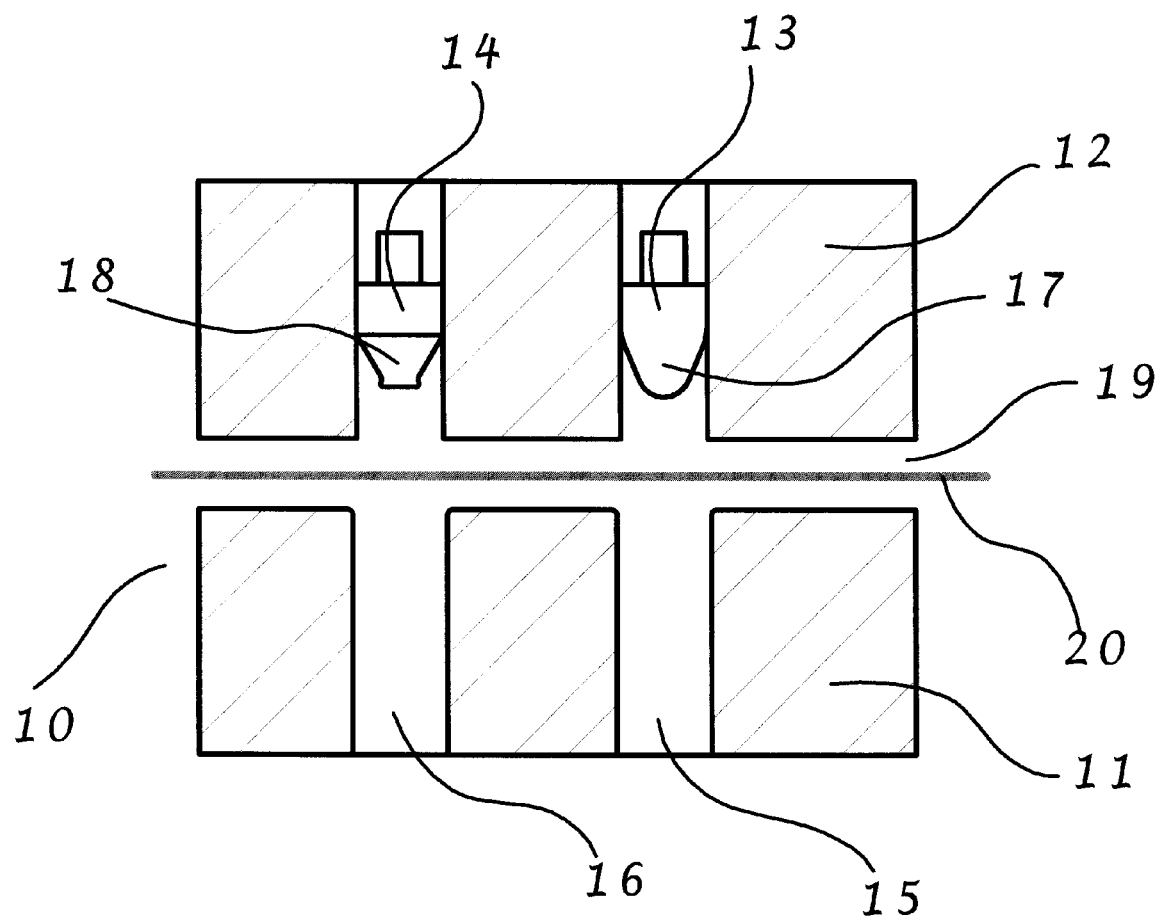
FIG. 1 shows a cross section of progressive forming dies

The present disclosure is directed to processes for manufacturing shaped articles such as shaped structures, containers, packaging, or blisters, suitable for unit-dose packaging. One purpose of the forming process is to produce a formed recess, such as a blister, suitable for holding pharmaceutical products, foodstuffs, luxury consumables, and technical articles. The pharmaceutical products may include but are not limited to medication, ampoules, pills, capsules, tablets, lozenges, dragées, suppositories, fast-dissolving dosage forms (e.g., freeze-dried dosage forms, lyophilized dosage forms), molded devices, and the like, which can then be sealed by the application of a coating such as a lidding over the opening of the formed recess. In particular, the disclosure is directed to manufacturing blister packages, for example for packaging pharmaceutical products. When the unit dose is a pharmaceutical product, the unit dose is typically the amount of a pharmaceutical dosage form administered to a patient in a single dose, and may comprise one or more active ingredients, as well as one or more excipients. Unit-dose packaging is the packaging of a unit dose in a non-reusable container.

The processes disclosed herein are capable of creating shapes and degrees of stretch in the film material that cannot be obtained by methods known in the art. The processes of this disclosure involve clamping a film such as a foil laminate and forcing a succession of stamping tools (i.e., plungers) into the film to produce a desired shaped recess (i.e., depression) in film. The process for manufacturing the shaped articles generally involves at least one retaining tool, at least one die, and at least two plungers. The retaining tool and the die are designed to hold a film between them, with the die having at least one opening, which allows the film layer to be deformed into the desired shape of the formed recess.

Plungers of various shape, size, number and surface finish (which exert, for example, varying degrees friction on the film) may be incorporated into the process. For example, a forming process may use a first plunger which exhibits a high degree of friction and a second or subsequent plungers which exhibit progressively higher or lower degrees of friction. The film layer may include a variety of different materials, including, but not limited to, thermoplastics, polymers, copolymers, composites and laminates. When the unit dose is a pharmaceutical dosage form, the film will need to be able to undergo aseptic manufacturing processes to produce sterile shaped articles, for example gamma ray irradiation. Preferably the film is flexible but capable of holding its shape, can be crushed with minimal force, creates a barrier, withstands radiation, and has desirable chemical properties (e.g., does not react with the pharmaceutical dosage form to be administered). For blister packs, the film is preferably a foil laminate, and more preferably a metal-plastic laminate. The metal-plastic laminate comprises a metal foil coated on at least one side, or on both sides, with a plastic layer. If the metal-plastic laminate comprises a plastic layer on both sides of the metal foil, the plastic layers may be the same type of plastic layer, or different types of plastic layers.

Materials which may be used in the plastic layer of the laminate are well known by those skilled in the art and include, but are not limited to, a variety of commercially available polymers and copolymers, such as polyvinylchloride, nylon, nylon derivatives, polybutylene terephthalate, polyethylene terephthalate, polyethylene, polypropylene, polystyrene, polyacetal, vinylidene chloride, propylene ethylene copolymers, polyethylene napthalate, fluoropolymers, cyclic polyolefins, polyamides, and similar materials or combinations thereof. The plastic layer may be present in the laminate at a thickness of about 8 μm to about 80 μm, about 10 μm to about 70 μm, about 15 μm to about 60 μm, about 20 μm to about 50 μm, or about 25 μm to about 40 μm, and any ranges therein. The plastic components may be non-stretched, or alternatively uniaxially or biaxially stretched, or may be thermoplastics such as halogen-containing polymers, polyolefins, polyamides, polyesters, acrylnitrile copolymers, or polyvinylchlorides. Typical examples of thermoplastics of the polyolefin type are polyethylenes such as low density polyethylene (LDPE), medium density polyethylene (MDPE), high density polyethylene (HDPE), uniaxially, or biaxially stretched polypropylenes, polypropylenes such as cast polypropylene and uniaxially or biaxially stretched polyethylene terephthalate (PET) from the polyester series. The above examples are in no way meant to be limiting, as other materials known in the art may be used in the plastic layer as well.

Examples of plastics based on halogen-containing polymers include but are not limited to polymers of vinylchloride (PVC) and vinyl plastics, containing vinylchloride units in their structure, such as copolymers of vinylchloride and vinylesters of aliphatic acids, copolymers of vinylchloride and esters of acrylic or methacrylic acids or acrylnitrile, copolymers of diene compounds and unsaturated dicarboxyl acids or their anhydrides, copolymers of vinylchloride and vinylchloride with unsaturated aldehydes, ketones, etc., or polymers and copolymers of vinylidenchloride with vinylchloride or other polymerizable compounds. The vinyl-based thermoplastics may also be made soft or pliable in a conventional manner by means of primary or secondary softeners.

If the plastic films comprise polyesters (PET-films), examples of polyesters include but are not limited to polyalkylene-terephthalate or polyalkylene-isophthalate with alkylene groups or radicals with 2 to 10 carbon atoms or alkylene groups with 2 to 10 carbon atoms interrupted by at least one oxygen atom, such as, e.g., polyethylene-terephthalate, polypropylene-terephthalate, polybutylene-terephthalate (polytetramethylene-terephthalate), polydecamethylene-terephthalate, poly 1.4-cyclohexyldimethylol-terephthalate or polyethylene-2.6-naphthalene-dicarboxylate or mixed polymers of polyalkylene-terephthalate and polyalkylene-isophthalate, where the fraction of isophthalate amount, e.g., to 1 to 10 mol. %, mixed polymers and terpolymers, also block polymers and grafted modifications of the above mentioned materials. Other useful polyesters are known in the field by the abbreviation PEN. Other polyesters are copolymers of terephthalic acid, a polycarboxyl acid with at least one glycol, copolymers of terephthalic acid, ethyleneglycol and an additional glycol, polyalkylene-terephthalates with alkylene groups or radicals with 2 to 10 carbon atoms, polyalkylene-terephthalates with alkylene groups or radicals with 2 to 10 carbon atoms which are interrupted by one or two oxygen atoms, polyalkylene-terephthalates with alkylene groups or radicals with 2 to 4 carbon atoms, and polyethyleneterephthalates (e.g., A-PET, PETP, PETG, G-PET). Glycol-modified polyesters are also referred to as PETG.

Examples of polyolefins for plastic films include but are not limited to polyethylenes (PE), e.g., high density polyethylene (HDPE, density larger than 0.944 g/cm), medium density polyethylene (MDPE, density 0.926-0.940 g/cm), linear polyethylene of medium density (LMDPE, density 0.926.0.940 g/cm), low density polyethylene (LDPE, density 0.910-0.925 g/cm), and linear low density polyethylene (LLDPE, density 0.916-0.925 g/cm), for example as non oriented (PE film) or uniaxially or biaxially oriented films (oPE film), polypropylenes (PP), such as axially or biaxially oriented polypropylene (oPP film), or cast polypropylene (cPP film), amorphous or crystalline polypropylene or mixtures thereof, ataktic or isotaktic polypropylene or mixtures thereof, poly-1-butene, poly-3-methylbutene, poly-4-methylpententene and copolymers thereof, polyethylene with vinylacetate, vinylalcohol, acrylic acid, such as, e.g., ionomeric resins, such as copolymers of ethylene with 11% acrylic acid, methacrylic acid, acrylic esters, tetrafluorethylene or polypropylene, statistical copolymers, block polymers or olefin polymer-elastomer mixtures, ionomers, and ethylene-acrylic acid copolymers (EAA).

If the plastic films comprise polyamide films (PA), examples of polyamides include but are not limited to polyamide 6, a homo-polymer of [epsilon]-caprolactam (polycaprolactam); polyamide 11, polyamide 12, a homo-polymer of [omega]-laurinlactam (polylaurinlactam); polyamide 6.6, a homo-polycondensate of hexamethylenediamine and adipinic acid (polyhexa-methylene-adi-amide); polyamide 6.10, a homo-polycondensate of hexa-methylene-diamine and sebacinic acid (poly-hexa-methylene-sebacamide); polyamide 6.12, a homo-polycondensate of hexa-methylene-diamine and dodecandic acid (poly-hexa-methylene-dodecana-mide) or polyamide 6-3-T, a homo-polycondensate of trimethyl-hexa-methylene-diamine and terephthalic acid (poly-trimethyl-hexa-methylene-terephthalic-amide), and mixtures thereof.

If the plastic comprise acrylnitrile-copolymers, examples of acrylnitrile-copolymers include but are not limited to copolymers of acrylnitrile or methacrylnitrile with acrylic acid esters, vinyl-carboxylate esters, vinyl halides, aromatic vinyl compounds or unsaturated carboxylic acid and diene, and acrylnitrile-methylacrylate copolymers.

Metals which may be useful in the foil component of the laminate are those that can be formed into a foil with the physical and chemical properties (e.g., thickness, malleability, temperature resistance and chemical compatibility) sufficient to adhere to the plastic layer(s) and remain intact during the forming processes disclosed herein. Such metals include, but are not limited to, aluminum, iron, nickel, tin, bronze, brass, gold, silver, chrome, zinc, titanium, and copper, combinations thereof, as well as alloys including the aforementioned metals, such as steel and stainless steel. The metal foil may be present in the laminate, for example, at a thickness of about 8 µm to about 200 µm, about 10 µm to about 150 µm, about 15 µm to about 125 µm, about 20 µm to about 100 µm, or about 25 µm to about 80 µm, and any ranges therein. In certain embodiments the foils, e.g., aluminum foil, may have a purity of at least about 98.0%, more preferably at least about 98.3%, still more preferably at least about 98.5%, and most particularly at least about 98.6%. Aluminum foils of the aluminum-iron-silicon or aluminum-iron-silicon-manganese types may also be used. Other suitable metal foils known in the art may be used as well.

The laminate may also include one or more adhesive layers between the foil layer and the plastic layer. The same or different adhesives may be used to adhere the plastic to the metal foil on each side. The adhesive layer should be capable of forming a bond with the plastic layer and the foil layer, and generally should be of a thickness of between about 0.1 µm and about 12 µm, more typically between about 2 µm and about 8 µm, and any ranges therein. Any number of adhesives known in the art may be used, and the adhesives may be applied using a number of known techniques. Suitable adhesives may contain one or more solvents, be solvent-free, or may be acrylic adhesives or polyurethane adhesives. The adhesive may also be a thermal bonding adhesive, for example an ethylene-vinylacetate copolymer or a polyester resin. The adhesive may also be of a type which hardens upon exposure to electromagnetic rays, for example ultraviolet rays. The laminate may also be formed by hot calendaring, extrusion coating, co-extrusion coating or through a combination of processes. Example adhesives that may be used in the present disclosure include but are not limited to polyethylene (PE) homopolymers, such as LDPE, MDPE, LLDPE, and HDPE; PE copolymers, such as ethylene-acrylic acid copolymers (EAA), ethylene methacrylic acid copolymer (EMAA); polypropylene (PP); PP copolymers; ionomers; and maleic anhydride grafted polymers.

In another embodiment, the film, e.g., a metal-plastic laminate, may feature a sealing layer in the form of a sealable film or a sealable counting on one of the outer lying sides, or on both of the outer sides. The sealing layer will be the outermost layer in the laminate. In particular, the sealing layer may be on one outer side of the film, which is directed towards the contents of the shaped packaging, in order to enable the lid foil or the like to be sealed into place.

Another embodiment for forming blister packaging is a laminate of aluminum, where the metal foil is coated with a plastic on each side. Aluminum foil is known to provide superior barrier properties to protect the contents of the package. The plastic coating provides an effective means of sealing the package plus provides a protective coating for the aluminum, and may also provide the ability to print on the package.

In some embodiments, the thicknesses and compositions of the laminate include but are not limited to:
i. OPA/ALU/PE (12 µm/60 µm/30 g/m$^2$);
ii. OPA/ALU/PE (12 µm/45 µm/30 g/m$^2$);
iii. OPA/ALU/PVC (12 µm/60 µm/30 g/m$^2$);
iv. OPA/ALU/PVC (12 µm/45 µm/30 g/m$^2$);
v. OPA/ALU/PP (12 µm/60 µm/30 g/m$^2$); and
vi. OPA/ALU/PP (12 µm/45 µm/30 g/m$^2$).

As used above, OPA stands for oriented polyamide, ALU stands for aluminum, PE stands for polyethylene, PVC stands for polyvinylchloride, and PP stands for polypropylene.

Prior to the present disclosure, those of skill in the art used the ratio of the diameter of the depression in the original surface of the film to the depth of the formed depression in the film to describe the degree of deformation of a film after forming. While this ratio is simple and easy to calculate, it does not describe the amount of stretch of the material, which is a more accurate reflection of the deformation of the film. Therefore, the diameter to depth ratio is limited in its ability to reflect the success of a particular process to reliably and repeatedly stretch a film such as a foil laminate. A better description of the degree of deformation is the "Area Ratio." The Area Ratio is the ratio of the area of the stretched or final recess formed in the film ($Area_F$) to the area of the original surface of the film ($Area_I$). The Area Ratio takes into account the stretch of the material and shape of the formed recess, not just its depth. The techniques of forming described in this application are known to successfully produce a formed recess, such as a blister, with an Area Ratio of about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, about 2.6, about 2.7, about 2.8, about 2.9, or about 3.0, to 1. As used herein, an Area Ratio of, for example, about "3.0" is equivalent to an Area Ratio of about "3.0/1."

Prior to the present disclosure, shaped articles made of laminates containing metal foils in the art were generally shaped into the desired structure using a cold-forming process. As used herein, the term "cold forming" refers to pressure forming under ambient conditions, e.g., without the application of exogenous heat. Cold-forming utilizes a temperature that is no higher than about 40° C., and more typically is no higher than about 35° C. As disclosed herein, a warm-forming process includes a warm forming step for manufacturing shaped articles using a film such as a metal foil containing laminate. The warm-forming process may comprise only warm-forming steps, or may comprise both warm-forming and cold-forming steps. When forming materials consisting of plastic film laminated to one or both sides of a metal foil, it is beneficial to warm the material during the forming step. Warming the laminate may help prevent delamination, allow the plastic to form with less tendency to warp back to the original shape, and result in a more uniform stretch of the material. To stretch and form the plastic without extruding it, the temperature of the material should be kept below the melting temperature of the plastic film during the warm-forming step. Warm-forming is therefore defined herein as forming a film such as a metal-plastic laminate in the temperature range of 45° C. to 95° C.; for example between 55° C. and 70° C., and any ranges therein. In other embodiments, the warm-forming step is performed at a temperature at or above 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C., 74° C., 75° C., 76° C., 77° C., 78° C., 79° C., 80° C., 81° C., 82° C., 83° C., 84° C., 85° C., 86° C., 87° C., 88° C., 89° C., 90° C., 91°

C., 92° C., 93° C., 94° C., or 95° C. In some embodiments disclosed herein, the process uses only warm-forming steps, cold-forming steps, or a combination of warm-forming and cold-forming steps.

The film layer is deformed into the desired shape of the formed recess using two or more plungers. The plungers employed in the present disclosure may be of any shape, including but not limited to cylindrical, conical, cone, blunted cone, pyramid, blunted pyramid, segment of a sphere or cap, or barrel shaped. The plungers may comprise particular vertical or steep side walls, vertical or sloping side walls, and the edges or periphery at the bottom of the plungers may have a small radius, or may be round or roundish in shape. It is preferred that the geometry of the shape-forming surface of the plungers vary to progressively form the desired recess, for example by using plungers with gradually different surface geometries. The recesses formed in the film according to the processes disclosed herein may be of any desired shape or depth, including but not limited circular, ovoid, square, triangular, rectangular, polygonal, and elliptical shapes, as well as complicated blister shapes such as deep blisters, blisters with steep angled or vertical walls, and deep blisters with a small inner radius and vertical walls. The base portion of the formed recess may be planar or hyperbolic, and may have a uniform width or a tapered width.

One unique aspect of the present disclosure involves the application of the first plunger to the film. While processes known in the art typically drive the first plunger into the film from 50% to less than 100% of the final desired depth, the processes disclosed herein drive the first plunger into the film to at least about 100% or greater of the final desired depth. For example, when two plungers are used, the first plunger is driven into the die opening, which causes the film to be formed into a primary contour, which has a depth of at least about 100% and up to about 150% of the depth of the formed recess, and any ranges therein. In other embodiments, the first plunger is driven into the film to a depth of about 105%, about 110%, about 115%, about 120%, about 125%, about 130%, about 135%, about 140%, or about 145%. The first plunger may also be driven to a diameter to depth ratio of less than about 2.5, about 2.4, about 2.3, about 2.2, about 2.1, about 2.0, about 1.9, about 1.8, about 1.7, about 1.6, or about 1.5. Thus, unlike other methods known in the art, the first step of the process disclosed herein produces substantially all of the draw of the film required for the final formed recess. Heat may be used to help accomplish this stretch in one or more warm-forming steps. In addition, the Area Ratio of the primary contour is from about 1.0/1 to 3.0/1, and any ranges therein, as described herein.

After the formation of the primary contour, a second or subsequent plunger is driven into the primary contour to a depth that is less than the depth of the primary contour, such that the second plunger forms a different geometric shape for the formed recess with substantially the same Area Ratio as the primary contour. Thus, the processes disclosed herein are again different from those known in the art, which typically involve driving a second or subsequent plunger to a depth greater than the depth achieved by the previous plunger, thereby producing additional draw of the film beyond that achieved by the first or previous plunger. In other methods known in the art, the second or subsequent plunger may also be driven to a depth beyond the final desired depth of the depression formed to compensate for films that spring back towards the original plane of the film. In contrast, for example, in the processes disclosed herein, the second (or subsequent) plunger is driven to a depth that is less deep than the first or previous plunger. The second (or subsequent plunger) may also be driven to a depth that is less than the final depth (i.e., less than about 100%) of the formed recess desired. In certain embodiments, the second (or subsequent plunger) plunger is driven into the film to a depth that is less than about 99%, about 98%, about 97%, about 96%, about 95%, about 94%, about 93%, about 92%, about 91%, about 90%, about 89%, about 88%, about 87%, about 86%, about 85%, about 84%, about 83%, about 82%, about 81%, or about 80% of the primary contour or of the formed recess. The second or subsequent plunger may reshape, stretch, or redistribute the previously drawn surface of the primary contour to form the geometric detail desired in the final formed recess. Thus, the second (or subsequent) plunger is not designed to substantially draw the film beyond the final shaped depth. Instead, the second (or subsequent) plunger reshapes, stretches, or redistributes the recess, which often results in decreasing the depth of the recess through directing the film into the desired shape. The application of heat in a warm-forming step with the second or subsequent plunger can help form the detail of the final recess.

Applying the second (or subsequent) plunger in a warm forming step can help to reduce elastic spring-back of the film, for example a metal-plastic laminate, and can assist in reducing potential delamination of the plastic layer(s) from the foil. Although the process described herein uses a first and second plunger, it is understood that more than two plungers may be used to achieve the desired shape of formed recess. Additionally, the forming of the desired formed recess may take place in a single line of sequential steps or in several parallel lines of sequential steps. For example, multiple plungers may be used to produce blister packs with a plurality of formed recesses.

The plungers disclosed herein may have the same or different degrees of friction when contacted with the film. For example, the plungers may be coated with a high friction layer or a low friction layer. In certain embodiments, the degree of friction is decreased with each successive plunger, while in other embodiments, the degree of friction is increased with each successive plunger. It is well within the skill of those in the art to vary the degree of friction of each successive plunger as desired, including increasing and/or decreasing the degree of friction as appropriate, even within a single series of plungers. The friction layer of the forming surface may comprise one or more plastics such as polytetrafluoroethylene (PTFE), polyoxymethylene (POM), polyethylene, polyacetal, polyethyleneterephthalate (PET), rubber (e.g., hard rubber), caoutchoucs, acrylic polymers, glass, ceramic, graphite, boron nitride, molybdenum disulphide, or mixtures thereof. Alternatively, the friction layer may comprise one or more metals, for example an aluminum, chromium, or steel layer (particularly polished metal layers), or a ceramic layer containing graphite, boron nitride or molybdenum disulphide. The surfaces of the plunger when metal may also be designed to achieve low friction values, for example by polishing.

In another embodiment, the process disclosure herein may be performed using plungers that are arranged coaxial or telescopically inside each other. For example, a first plunger can form the first contour, and then be raised within the first contour followed by the lowering of a second plunger, which slides telescopically in the first plunger, to effect the final forming of the desired recess in the film.

After the desired recess is formed, it may be sealed by the application of a coating such as a lidding over the opening of the formed recess. Sealing methodologies are well known to those of skill in the art, including but not limited to flat seals, diamond patterns, or otherwise applying heat and/or pressure (e.g., using a press, hot roller, platen press or a heated platen press) to the surfaces of the film and the coating. In certain embodiments, the lid stock material is puncturable at a limited distance, does not form flaps, is capable of splitting, creates a seal with the piercer (if present), minimizes the generation of particulates, creates a barrier, withstands radiation, has desirable chemical properties (e.g., does not react with the pharmaceutical dosage form to be administered), and/or can be printed on. Industry guidelines suggest a seal width in the range of 0.1 inch. When packaging pharmaceutical dosage forms, it is important to achieve a good seal such that gases or other environmental elements cannot diffuse into the formed recess and damage the dosage form packaged therein. In certain embodiments, particularly when the unit dose is small, it is desirable to minimize the area of the seal.

The sealing of a coating such as a lid stock onto a plane of film with one or more formed recesses may be accomplished in an area (e.g., circular area) around the shaped recess. When narrow seals are required, the flat seal may not provide sufficient seal strength to resist dynamic pressure when the formed recess (e.g., a blister) is crushed. Although such a seal is usually adequate to prevent water vapor or oxygen transmission, it may be more likely to leak when the contents are placed under the pressures caused during the dispensing process. Diamond pattern seals may provide a stronger seal by utilizing concentrated points of pressure to create a more robust seal. But diamond pattern seals, which are usually in a linear array pattern, may not uniformly encircle a round blister and may not be consistent around the circumference of the seal, especially in a narrow-width seal on a small blister. Thus, in certain embodiments, it may be desirable to add contours to the sealing area to reduce the width required by at least half or, conversely, produce a substantially stronger seal when using the suggested width. For example, creating annular seals (corrugated in the cross section) may provide the same benefits as the diamond pattern, but in a manner that is uniform around the circumference of the blister seal.

To produce a controlled spray of liquid when bursting a sealed formed recess, such as a shaped blister, an internal piercer inside the sealed blister may be used, and may be positioned such that it maintains contact with the lid material. Internal piercers are disclosed in U.S. Pat. No. 5,411,175, U.S. Ser. Nos. 11/114,251, 11/971,471 and 12/121,644, each of which is incorporated herein by reference. The internal piercer can take different shapes, including but not limited to a funnel design, or a disc shape design. The internal piercer may be constructed of styrene, polystyrene, or other pharmaceutical grade FDA approved materials of sufficient hardness to penetrate the lid material. The second, subsequent and/or final plunger(s) may be designed to shape the formed recess such that the internal piercer is locked into place within the formed recess, e.g., through manufacture, handling, transportation, storage, and actual use. For example, in a shaped blister, a protruding structure, an indentation, a diaphragm or an annulus may be formed to conform to the shape of the base of the internal piercer. The protruding structure, indentation, diaphragm, or annulus provides support for and holds the internal piercer in place during assembly and during dispensing. Thus, these structures function to capture the internal piercer (e.g., restrict vertical movement of the piercer), thereby holding it in place. The internal piercer may also be held in place through manufacture and actual use by, for example, press fit, welding, hydrostatic forces, or electrostatic forces. The shaped blister can also be formed by the second or subsequent plunger such that it insures that the protruding structure, indentation, diaphragm, or annulus seals to the internal piercer in order to achieve the desired spray pattern.

In certain embodiments, the internal piercer includes a hollow tube or channel (the delivery channel) through which the pharmaceutical dosage form flows as the shaped recess is compressed and pierced. In some embodiments, the tip of the piercer has an angled edge to aid in penetration of the lid material. The inside diameter of the piercer tube can range from about 0.015 inches to about 0.05 inches, but in certain embodiments is about 0.025 inches. The internal diameter, shape, or surface texture of the delivery channel, whether in, near, and/or at the exit point, may contain a nozzle or may be varied to form the optimum droplet size and spray plume geometry of the pharmaceutical dosage form as it exits the shaped article, as well as control the velocity, pressure, pattern, distribution, and aim of the released substance. Thus, the nozzle system and the piercer may be integrated into a single unit. The nozzle system can also be designed to determine the mixing of the substance as it is released.

In other embodiments the present disclosure can be described as an internally pierced unit-dose packaging that includes a substantially dome shaped, flexible blister, a substantially round pierceable surface sealed to the base of the dome-shaped blister, and an internal chamber containing a piercing nozzle as described herein and a pharmaceutical dosage form, for example a liquid composition. In certain embodiments the piercing nozzle includes a base and a piercing end, wherein the base is attached to the dome shaped blister and the piercing end is proximate the pierceable surface.

The following embodiments are included to illustrate the compositions and methods disclosed herein. It should be appreciated by those of skill in the art, in light of the present disclosure, that many changes can be made in the specific embodiments which are disclosed herein and still obtain a like or similar result without departing from the spirit and scope of the invention.

FIG. 1 shows an embodiment of progressive forming dies with a die set 10 comprising a lower die plate 11 and an upper die plate 12. The lower die plate 11 has a primary forming chamber 15 and final forming chamber 16. The upper die plate 12 has a primary shaping plunger 13 and a second, final shaping plunger 14, such that the primary forming chamber 15 and the primary shaping plunger 13 are aligned. Likewise, the final forming chamber 16 and the final shaping plunger 14 are aligned. The upper die plate 12 may be movable upwards from lower die plate 11, or the lower die plate 11 may be movable downwards from the upper die plate 12, thereby creating a space 19 between the die plates allowing a film, for example a laminate containing a metal foil-plastic layer 20 to be inserted between the die plates. The primary shaping plunger 13 has a shaped surface 17, which is positioned to drive into the film 20 and produce a primary contour 21 (shown in FIG. 2). Final shaping plunger 14 has a shaped surface 18 which is positioned to drive into the film 20 and produce a final contour 22 (shown in FIG. 3).

The embodiment of FIG. 2 shows the upper die plate 12 pressed against the lower die plate 11 by forces 30 and 31 clamping the film 20 firmly between the die plates. The primary contour 21 has already been formed in the film 20 and positioned under the final shaping plunger 14. The embodiment of FIG. 3 shows the primary shaping plunger 13 being driven into the film 20 by force 33, creating primary contour 21 in the film 20. Simultaneously, the final shaping plunger 14 is driven into the primary contour 21 by force 32 creating final contour 22. The depth of the primary contour 21 is greater than the final contour 22.

Figure 2:
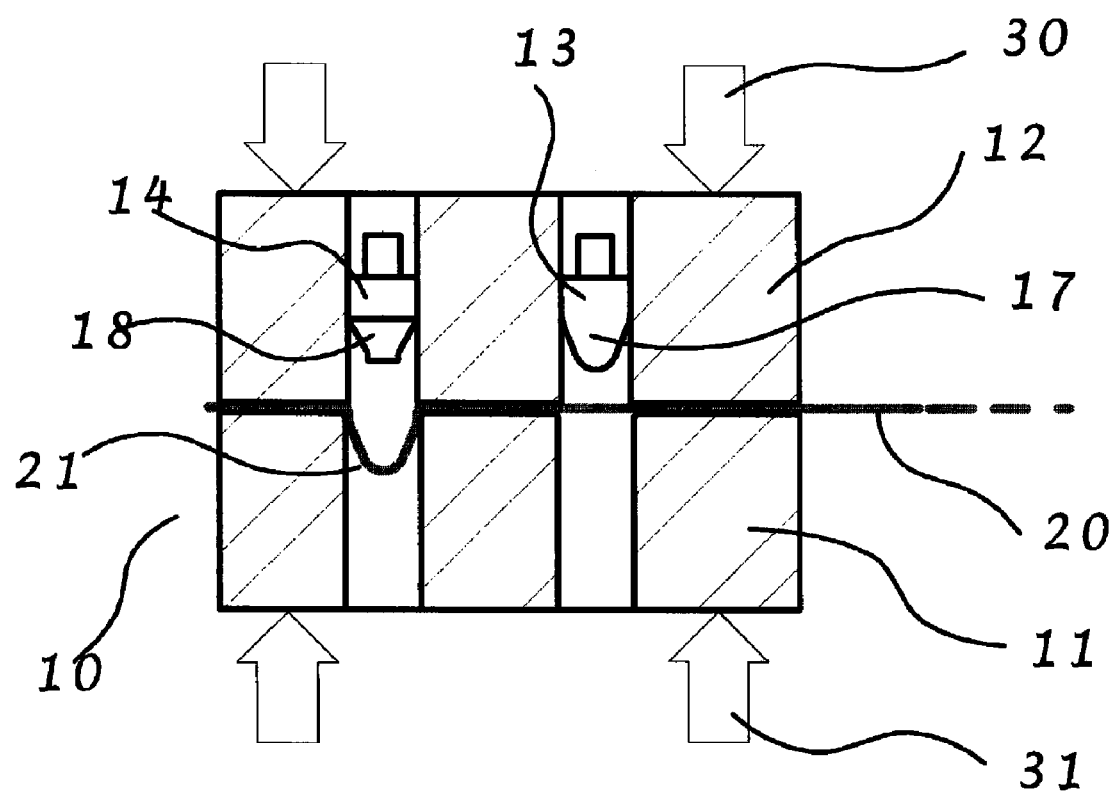
FIG. 2 shows a first stage of progressive forming
Figure 3:
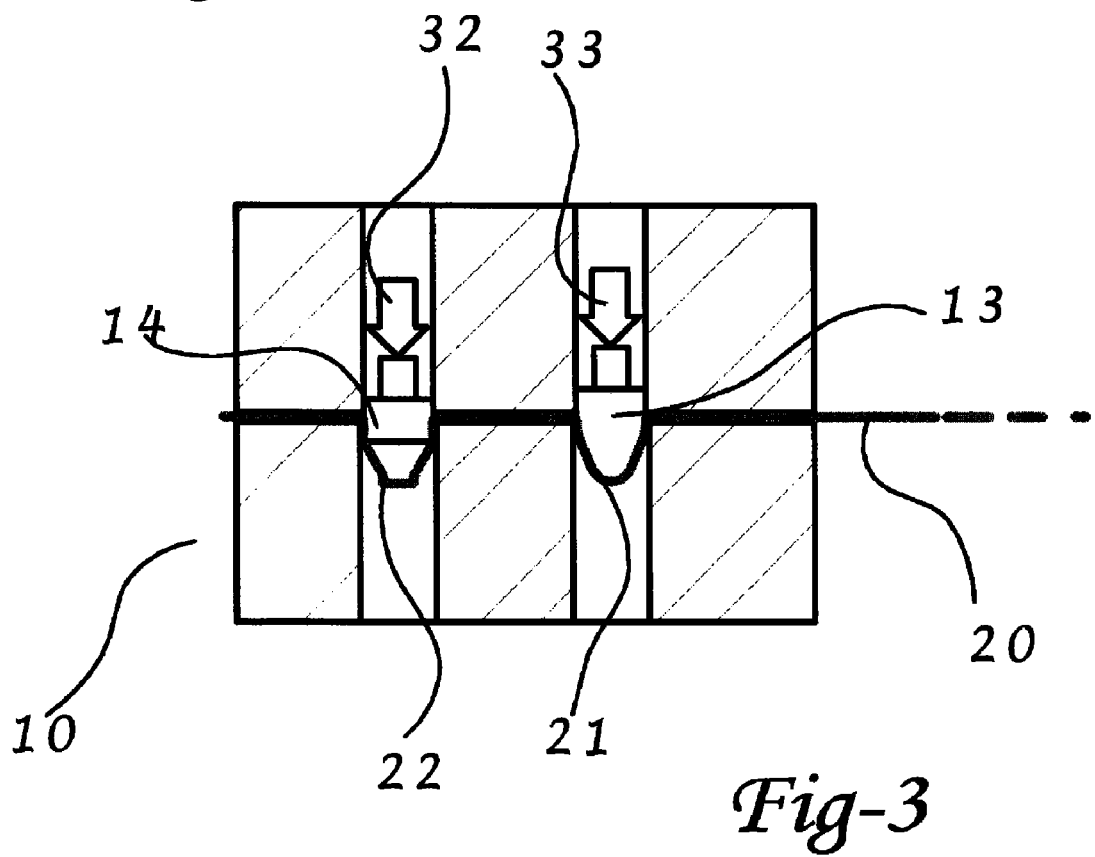
FIG. 3 shows a second stage of progressive forming
Figure 4:
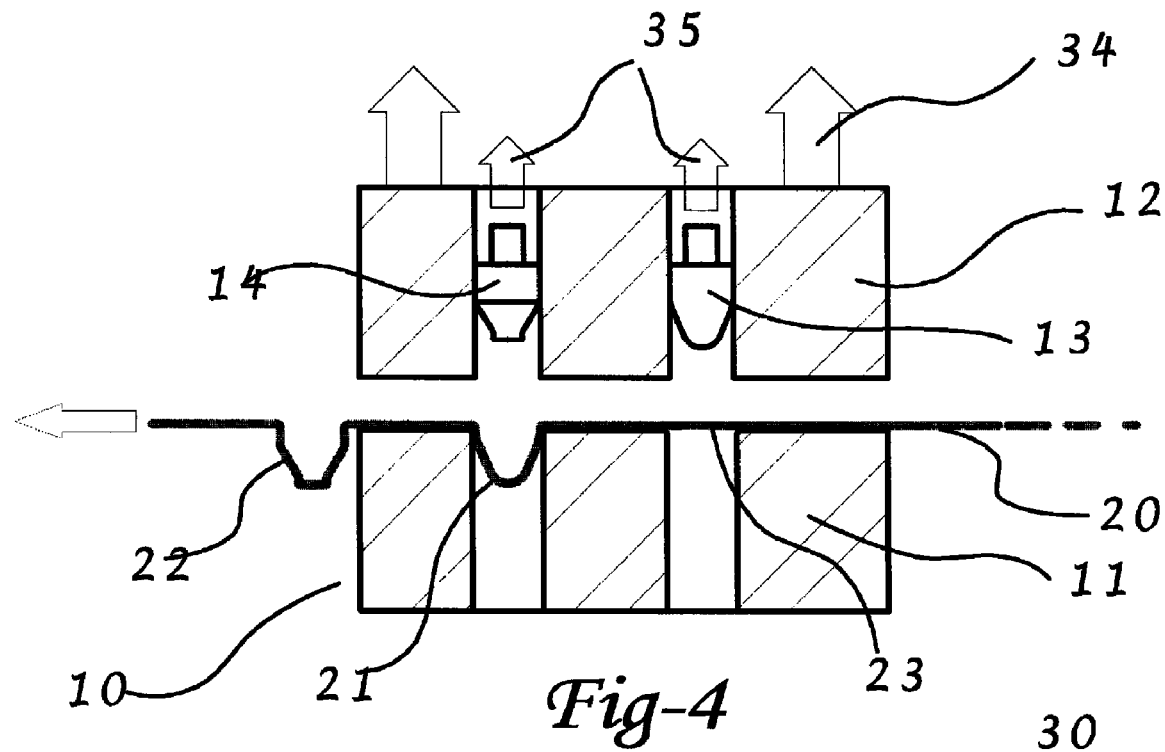
FIG. 4 shows a third stage of progressive forming
Figure 5:
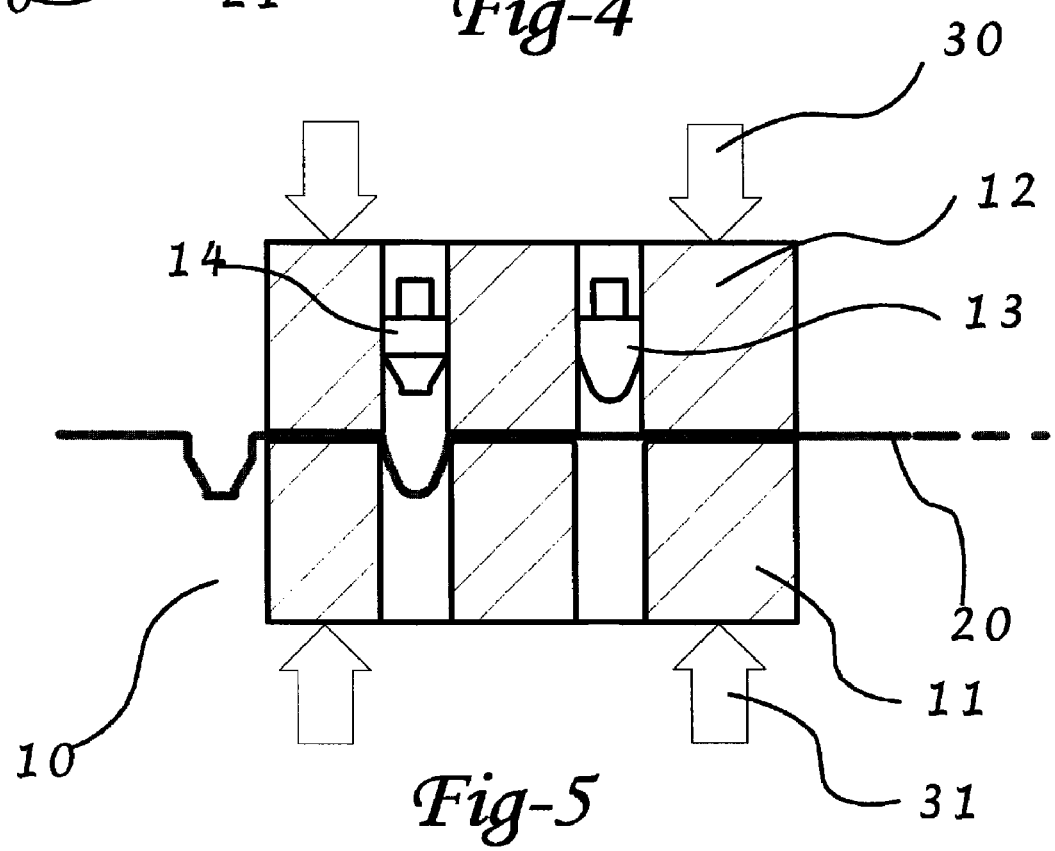
FIG. 5 shows the return to first stage of progressive forming

The embodiment of FIG. 4 shows the plungers retracted by force 35 and the upper die plate 12 opened upward by force 34. The opening of the die set 10 allows the film 20 to be advanced as shown by the arrow such that an unformed area 23 of the film 20 is positioned below the primary shaping plunger 13, the primary contour 21 is repositioned under the final shaping plunger 14, and the final contour 22 is removed from the die set 10. The embodiment of FIG. 5 shows the die set 10 clamped by forces 30 and 31 and the film 20 in position for the next forming step similar to step 1 shown in FIG. 2. Thus, by repeating the steps, final contours 22 are produced and are ready for placement of medication, pills, devices, etc. into the formed blister for sealing into the complete package.

Figure 6:
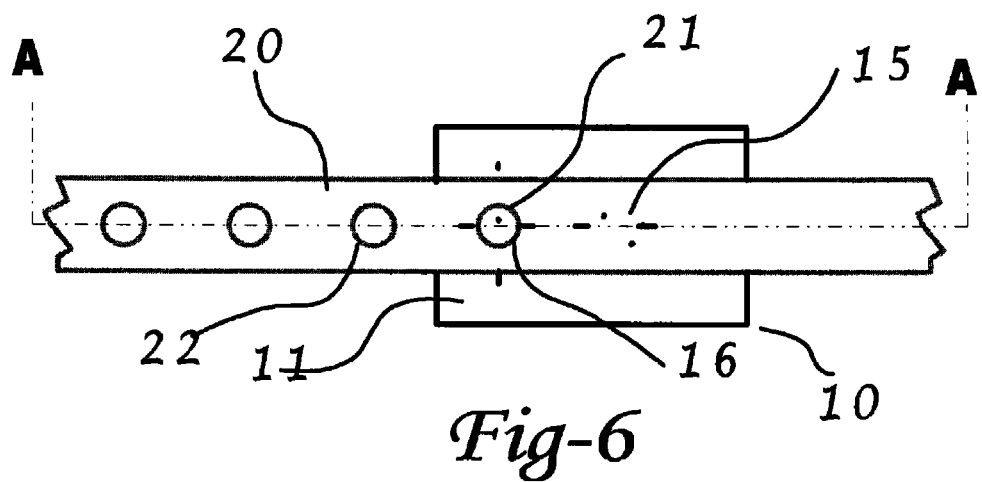
FIG. 6 shows a plan view of single row of dies
Figure 7:
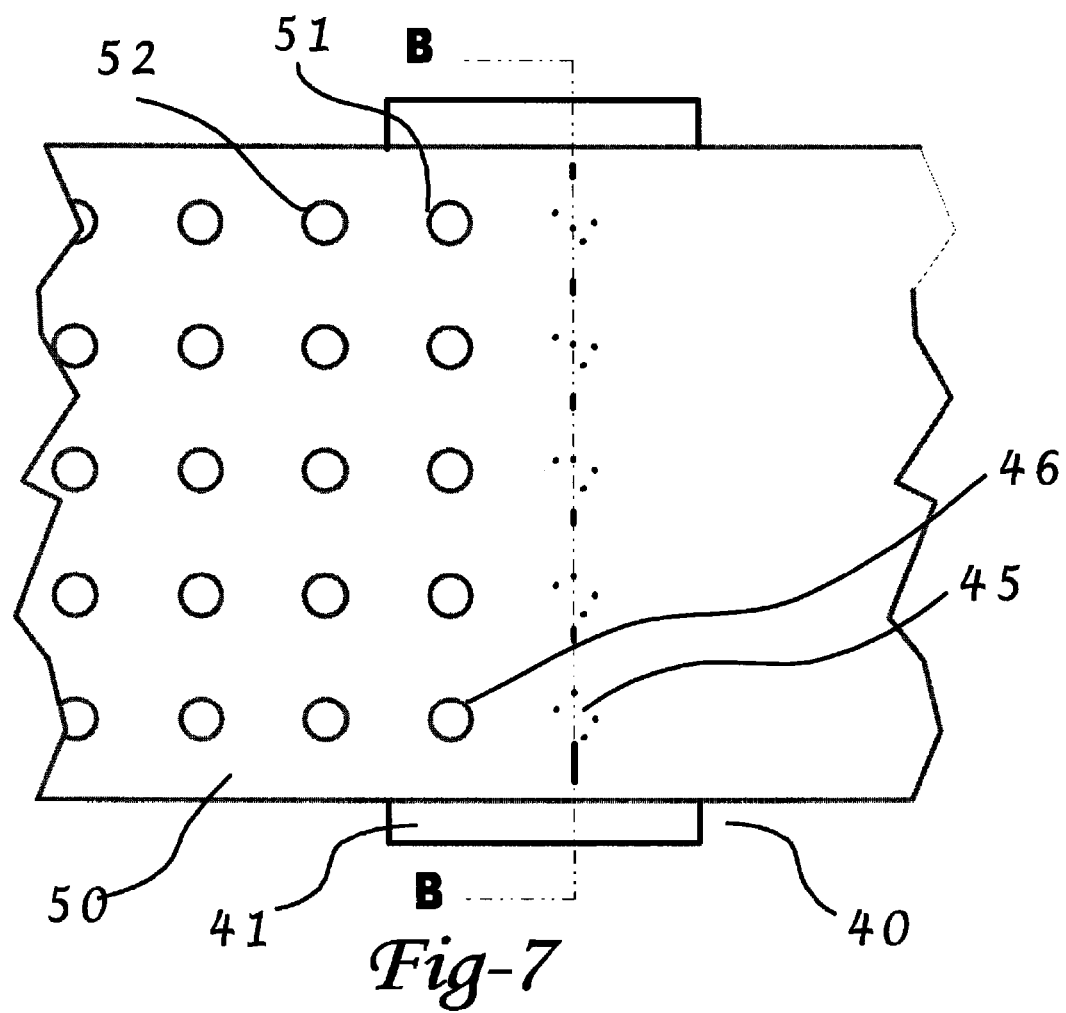
FIG. 7 shows a plan view of multiple rows of dies

FIG. 6 shows a plan view of a single strip of film 20 positioned over the lower die plate 11 with a single row of forming chambers 15 and 16. Such a configuration produces a strip of formed blister shapes in a single row. FIG. 7 shows a strip of film 50 that is wide enough for five rows of forming dies over a lower die set 41 which contains five rows of forming chambers 45 and 46. It will be obvious to one of skill in the art that any number of rows of shaping dies and chambers can be incorporated into a die set. Five are shown to illustrate the principle only. FIG. 8 shows a cross section through the single row die set 10 with final contours 22 produced in a single row. FIG. 9 shows a cross section through the primary shaping plungers 43 of the five station die set 40. A cross section through any one of the five rows of forming dies would look like FIG. 8.

Figure 10:
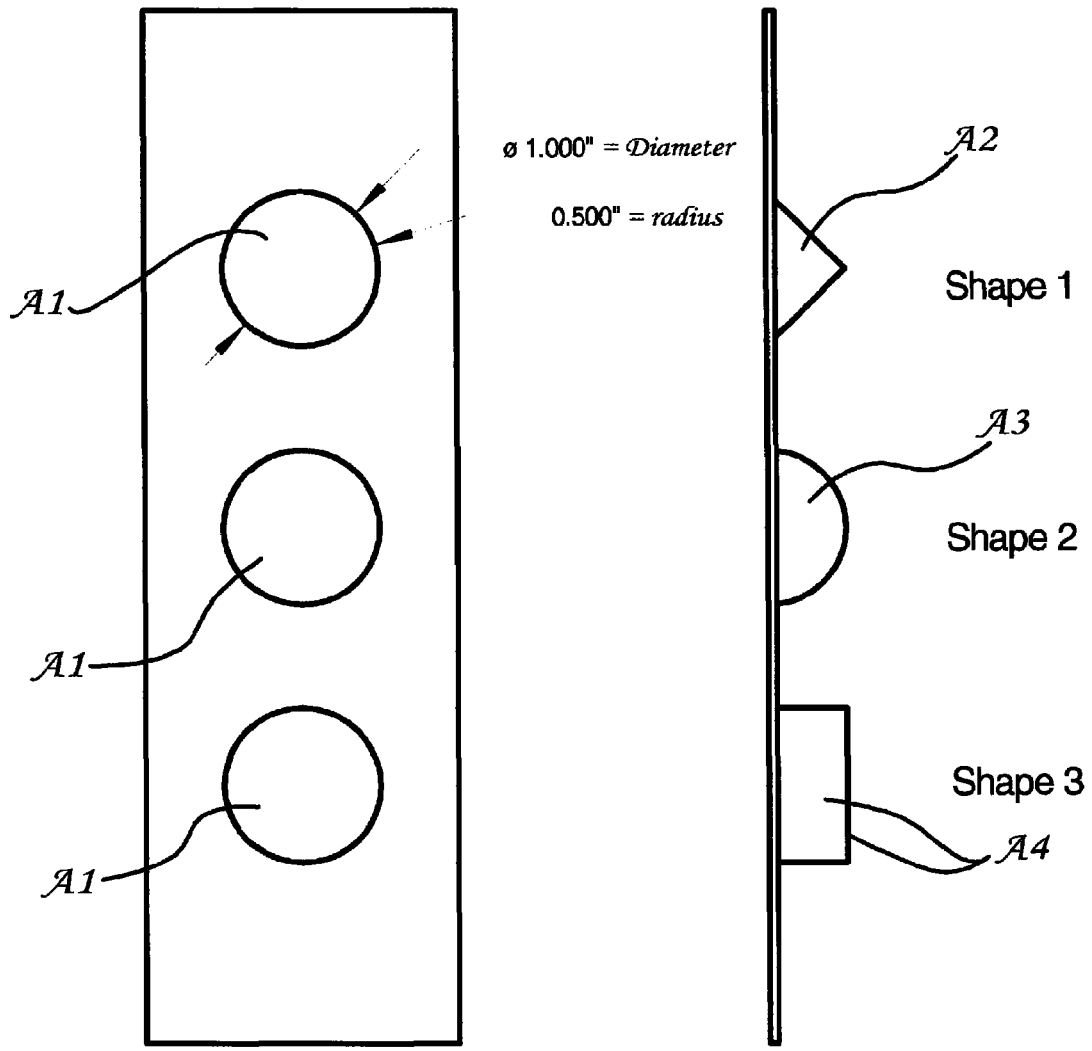
FIG. 10 illustrates the difference between Draw Ratio and Area Ratio

FIG. 10 shows the difference in Area Ratio and Draw Ratio for three different shapes with the same draw ratio. Shapes 1, 2 and 3 represent vastly different amounts of stretch of the film, as well as varying levels of difficulty to form. As shown, while the Draw Ratio does not distinguish between these differences, the Area Ratio is very descriptive of the degree of film forming in each case. If the film is drawn substantially uniform in the formed recess, the new thickness could be calculated as the Original Material Thickness/Area Ratio.

Figure 11:
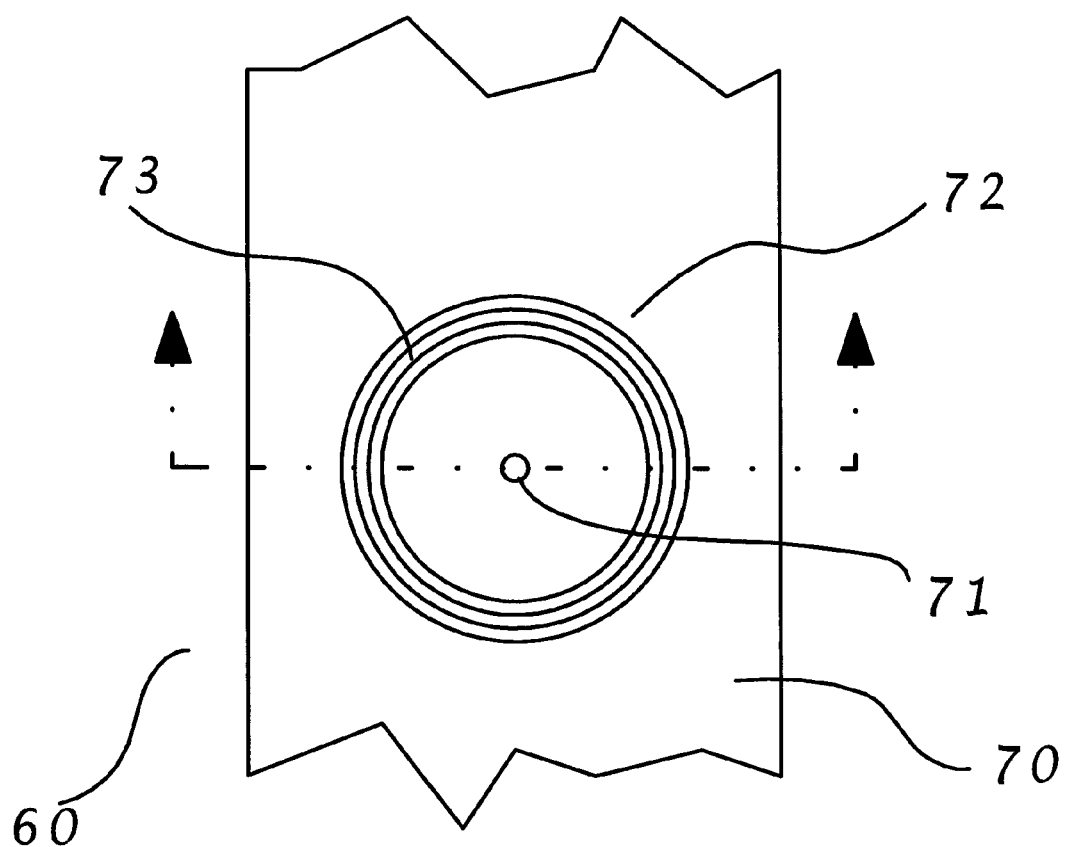
FIG. 11 shows a top view of sealed blister package
Figure 12:
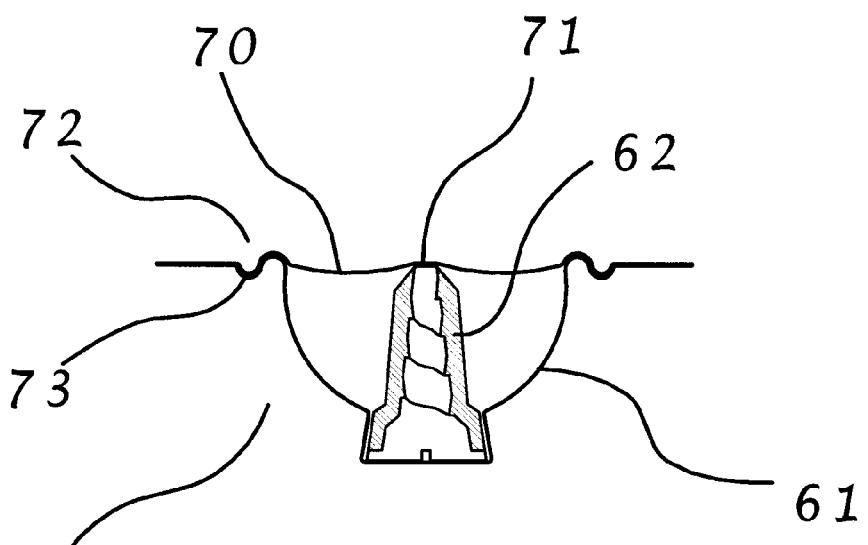
FIG. 12 shows a cross section of sealed blister package

The Area Ratio for each of the three shapes shown in FIG. 10 is calculated as follows:

Beginning Surface Area Within Mold Clamp $(Area_I) = \pi r^2 = \pi(0.5^2) = 0.78 \text{ in}^2$ For each of the three shapes, the Formed Surface Area $(Area_F)$ is:

Shape 1: Curved surface of a cone $= \pi r \sqrt{r^2+h^2} = \pi(0.5)\sqrt{0.5^2+0.5^2} \, 1.11 \text{ in}^2$ Shape 2: Hemisphere surface $= 2\pi r^2 = 2\pi(0.5^2) = 1.57 \text{ in}^2$ Shape 3: Cylinder bottom+side $= 2\pi rh + \pi r^2 = 2\pi(0.5)(0.5) + \pi(0.5^2) = 2.35 \text{ in}^2$ The Area Ratio $= Area_F/Area_I$ Shape 1: $1.11/0.78 = 1.41$ Shape 2: $1.57/0.78 = 2.0$ Shape 3: $2.35/0.78 = 3.0$ FIG. 11 shows a top view of a sealed blister package 60 with formed shapes 73 in the sealing area 72 of the lid stock 70. The contact point 71 is produced by the top of the nozzle of an internal piercer 62 (shown in FIG. 12). FIG. 12 shows a cross section of a sealed blister package 60 with an internal piercer 62 held in position within the shaped blister 61. The nozzle of the piercer 62 is held against the lid stock 70 at contact point 71. The seal is strengthened by the incorporation of formed shapes 73 in the seal area 72.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept, spirit and scope of the invention. More specifically, it will be apparent that certain agents that are chemically or physiologically related may be substituted for the agents described herein while the same or similar results would be achieved. All such similar substitutes and modifications apparent to those skilled in the art are deemed to be within the spirit, scope and concept of the invention as defined by the appended claims.

The invention claimed is:

1. A process for manufacturing a shaped article for unit-dose packaging with at least one formed recess, which comprises:
   (a) holding a film between at least one retaining tool and at least one die, wherein the die has at least one die opening;
   (b) driving a first plunger into the die opening, which causes the film to be formed into a primary contour, the contour having a depth of at least about 100% and up to about 150% of the depth of the formed recess, and an Area Ratio of about 1.0 to about 3.0; and
   (c) driving a second plunger into the primary contour to a depth that is less than the depth of the primary contour, wherein the second plunger forms a different geometric shape for the formed recess with substantially the same Area Ratio as the primary contour.

2. The process of claim 1, wherein the film is a metal-plastic laminate.

3. The process of claim 1, wherein the Area Ratio is about 2.0.

4. The process of claim 1, wherein step (b) is performed using a warm-forming step.

5. The process of claim 1, wherein step (b) is performed using a cold-forming step.

6. The process of claim 1, wherein step (c) is performed using a warm-forming step.

7. The process of claim 1, wherein step (c) is performed using a cold-forming step.

8. The process of claim 1, wherein steps (b) and (c) are performed using a warm-forming process.

9. The process of claim 1, wherein steps (b) and (c) are performed using a cold-forming process.

10. The process of claim 1, wherein the second plunger is driven into the primary contour to a depth of up to 95% of the formed recess.

11. The process of claim 1, wherein the second plunger redistributes the film which forms the different geometric shape for the formed recess.

12. The process of claim 1, wherein the shaped article comprises one or more shaped blisters.

13. The process of claim 12, wherein the shaped article comprises one or more multi-layer blisters with multiple chambers.

14. The process of claim 1, wherein the shaped article comprises one or more stacked blisters with lidding.

15. The process of claim 1, wherein the shaped article comprises two or more connected shaped blisters.

16. The process of claim 1, further comprising placing a unit dose of a pharmaceutical dosage form in the packaging recess.

17. The process of claim 16, wherein the pharmaceutical dosage form comprises one or more active ingredients.

18. The process of claim 17, wherein the upper die plate comprises the first plunger and the second plunger.

19. The process of claim 17, wherein the lower die plate comprises a primary forming chamber and a final forming chamber.

20. The process of claim 16, wherein the pharmaceutical dosage form is in aqueous form.

21. The process of claim 1, further comprising placing a fluid for dispensing in the packaging recess.

22. The process of claim 1, wherein a foil lidding is sealed onto the shaped article.

23. The process of claim 1, wherein the retaining tool is an upper die plate and the die is a lower die plate.

24. The process of claim 1, wherein the first plunger comprises a high friction forming surface.

25. The process of claim 1, wherein the second plunger comprises a low friction forming surface.

26. The process of claim 1, wherein driving the first plunger into the film has a higher friction than driving the second plunger into the film.

27. The process of claim 1, wherein the die has a plurality of spaced die openings.

28. The process of claim 1, wherein the Area Ratio is from about 1.1 to about 3.

29. The process of claim 1, wherein the Area Ratio is from about 1.5 to about 2.5.

30. The process of claim 1, wherein step (b), step (c) or steps (b) and (c) further comprise warming the die by exogenous heat to a temperature above ambient and below the melting point of the film.

31. The process of claim 30, wherein the die is warmed to a temperature between 35° C. and 95° C.

* * * * *